Jan. 24, 1939.  E. O. MELMER  2,144,769
OVERLOAD RELIEF STRUCTURE
Filed March 10, 1938  3 Sheets—Sheet 1
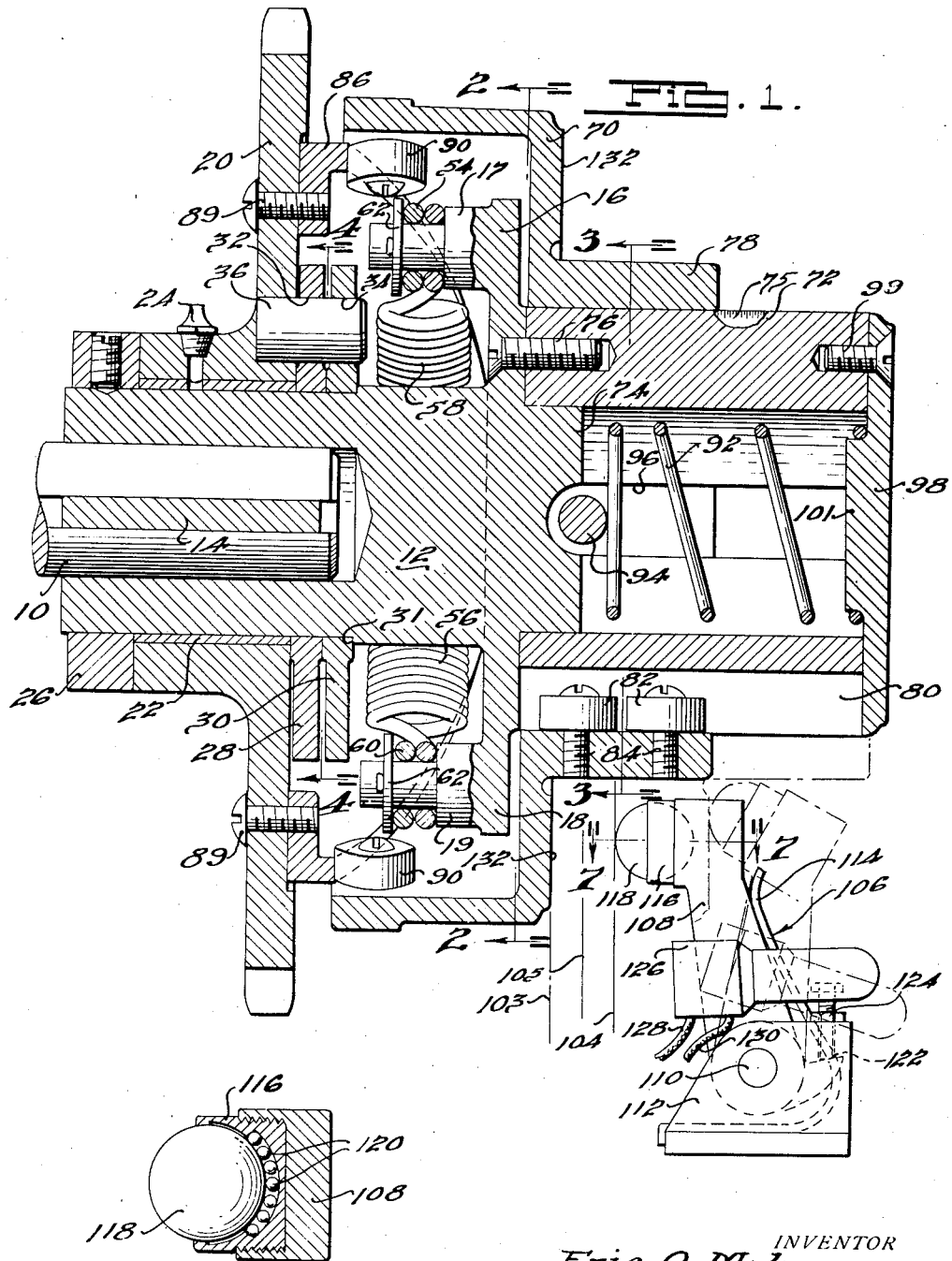
INVENTOR
Eric O. Melmer.
BY
Harness, Dickey & Pierce.
ATTORNEYS.

Jan. 24, 1939.　　　　　E. O. MELMER　　　　　2,144,769
OVERLOAD RELIEF STRUCTURE
Filed March 10, 1938　　　3 Sheets-Sheet 2
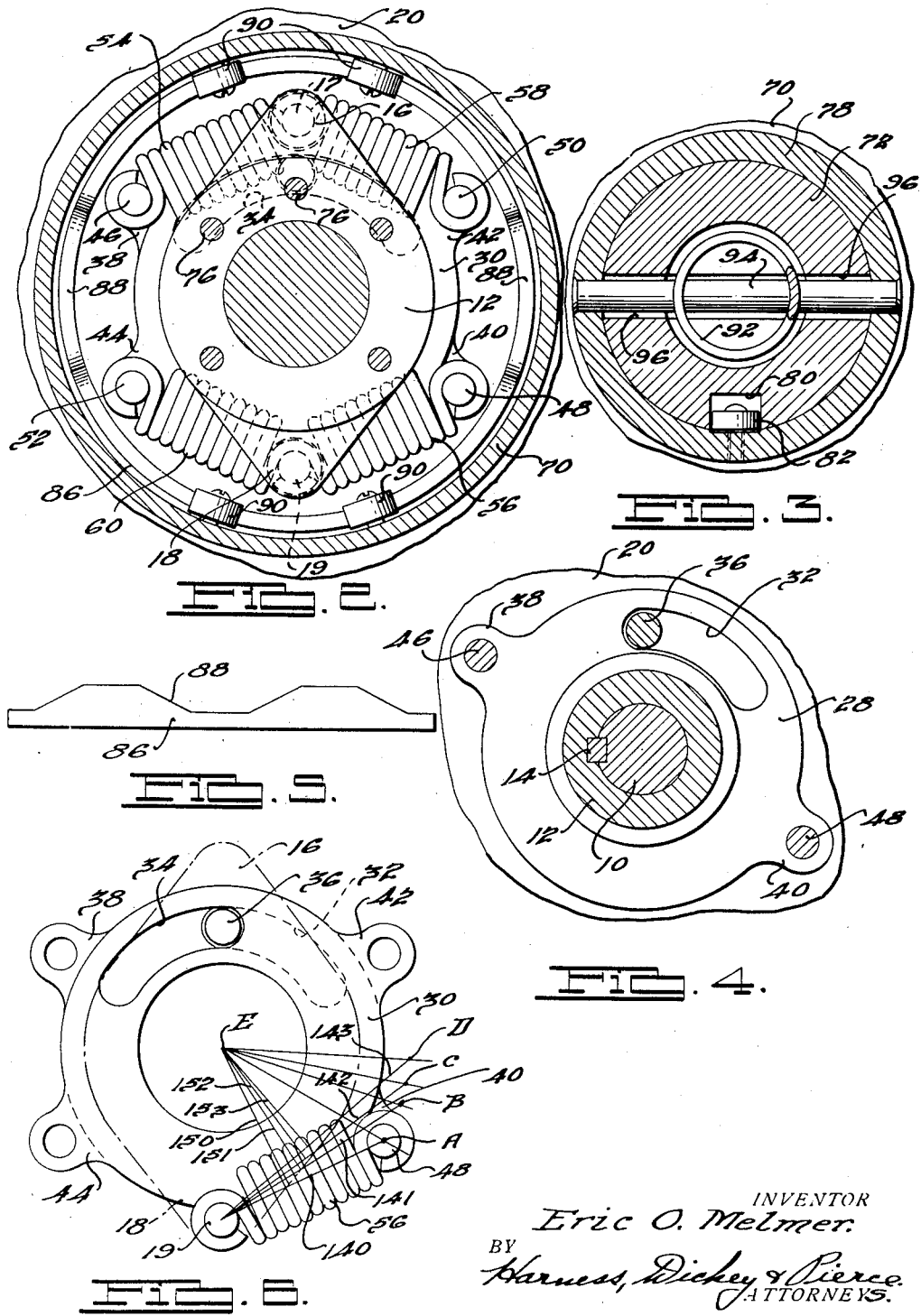
INVENTOR
Eric O. Melmer.
BY
Harness, Dickey & Pierce
ATTORNEYS.

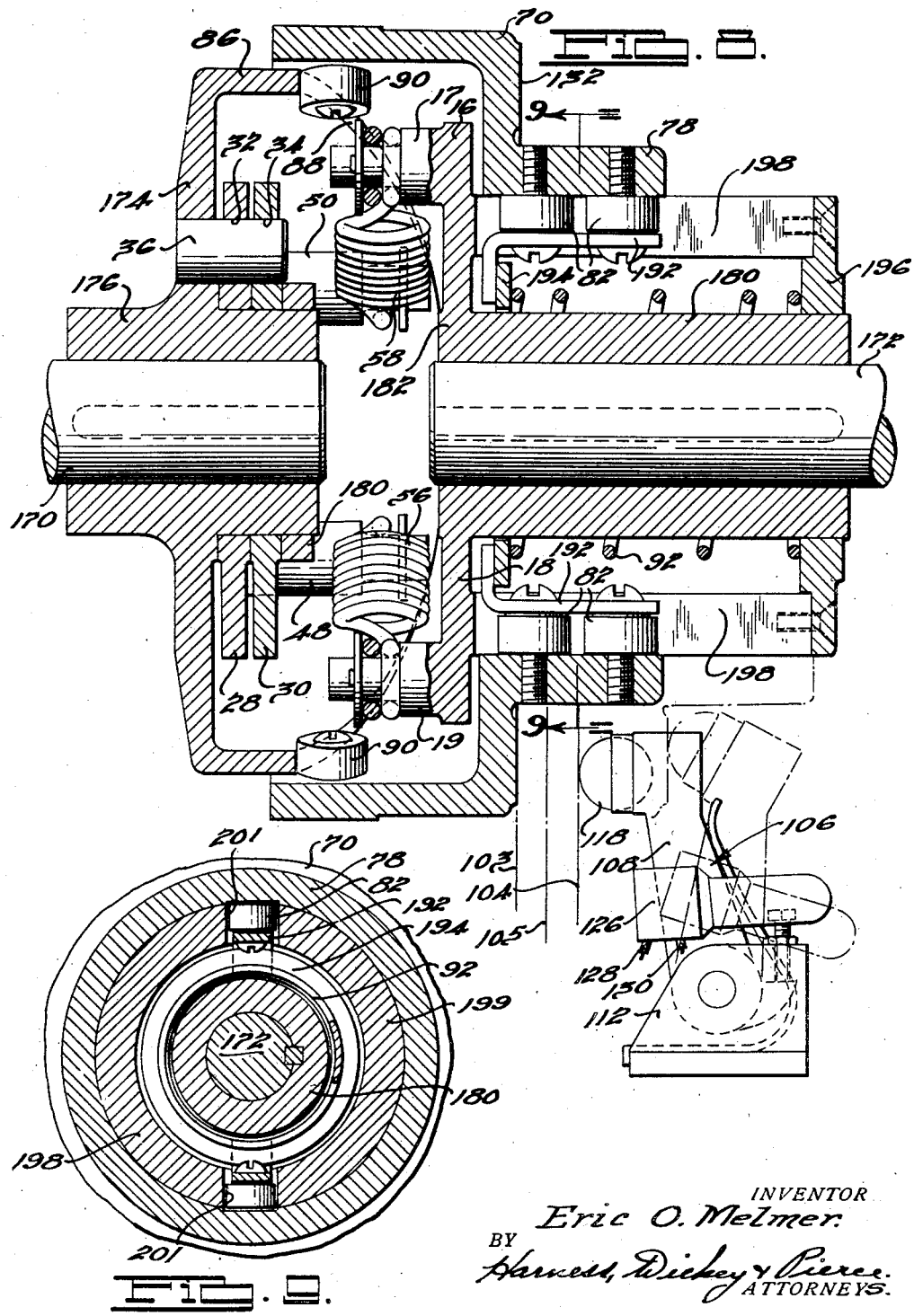

Patented Jan. 24, 1939

2,144,769

UNITED STATES PATENT OFFICE 2,144,769

OVERLOAD RELIEF STRUCTURE

Eric O. Melmer, Detroit, Mich., assignor to Anchor Steel & Conveyor Company, Detroit, Mich., a corporation of Michigan Application March 10, 1938, Serial No. 195,205

7 Claims. (Cl. 64—29)

This invention relates to automatic overload control devices; and particularly relates to such devices which automatically actuate a control switch, or the like, for cutting out a machine upon overload to thereby prevent injury to the machine.

One of the primary objects of the present invention is to provide an overload control mechanism which becomes more sensitive as the load increases and which is most sensitive when the load approaches its controlled maximum.

Another object of the invention is to provide an overload control device interposed between driving and driven members which is operable for either direction of rotation of the driving member and which includes resilient connections for both directions of rotation, respectively, so constructed and arranged that upon rotation in one direction only certain of the resilient means are loaded and the others idle, and upon rotation in the reverse direction the others are loaded and the first idle.

A further object of the invention is to provide a lost motion connection between the resilient means, in the type of control device mentioned, and the driving or driven means so that upon rotation in one direction, only certain of the resilient means are loaded while the others are idle and relaxed, thereby lengthening the life of the device.

Another object of the invention is to provide a roller connection between an axially movable annular or ring member and an elongated slot in one of the members of the driving or driven connection so that the ring may be moved axially in a relatively free manner without undue wear on the parts, thereby insuring a positive and tight connection between the parts.

Another object of the invention is to provide an overload control device which is adapted for a variety of different uses such as in the driving connections of multiple or single drive conveyer systems, flexible shaft couplings, and the like.

Other objects of the invention will become apparent from the following specification, the drawings relating thereto, and the claims hereinafter set forth.

In the drawings, in which like numerals are used to designate like parts in the several views throughout:

Figure 1 is a vertical cross-sectional view through a control mechanism embodying features of the present invention;

Fig. 2 is a fragmentary, cross-sectional view on a slightly reduced scale taken substantially along the line 2—2 of Fig. 1;

Fig. 3 is a fragmentary, cross-sectional view on a slightly reduced scale, taken substantially along the line 3—3 of Fig. 1;

Fig. 4 is a fragmentary, cross-sectional view on a slightly reduced scale taken substantially along the line 4—4 of Fig. 1;

Fig. 5 is a diagrammatic developed view of the cam ring illustrated in Figs. 1 and 2;

Fig. 6 is a view similar to Fig. 2 with certain of the parts removed diagrammatically illustrating the structure in various positions during operation;

Fig. 7 is a cross-sectional view with parts in elevation taken substantially along the line 7—7 of Fig. 1;

Fig. 8 is a view similar to Fig. 1, illustrating the present invention as applied to a flexible coupling; and Fig. 9 is a fragmentary, cross-sectional view on a slightly reduced scale taken substantially along the line 9—9 of Fig. 8.

Referring to the drawings, and referring particularly to Figs. 1 to 7, an overload control device embodying features of the present invention is illustrated which is particularly adapted for use with either multiple or single drive units for conveyer systems. The control device illustrated includes a driven shaft 10 adapted for suitable connection to a conveyer mechanism. The shaft 10 is connected to a driven member 12 for rotation therewith by a key 14, and has diametrically opposed, radially extending, lever arms 16 and 18. The lever arms 16 and 18 have axially extending bosses 17 and 19, respectively, at the outer ends thereof which are adapted to be connected to spring members in a manner to be described in detail hereinafter. The bosses 17 and 19 may be either formed integral with the lever arms 16 and 18 or may be formed separately and be removably attached to the lever adjacent the outer ends thereof.

A driving member in the form of a sprocket wheel 20 is rotatably mounted on the driven member 12 and rotatably engages a bearing sleeve 22 which embraces a portion of the driven member 12. The sprocket wheel may be connected to a chain (not shown) which in turn may be connected through a variable speed mechanism, such as a Reeves drive, to a driving motor. A suitable lubricating attachment is preferably provided so that the parts may be properly lubricated and free rotation may exist between the sprocket wheel 20 and the member 12. A collar 26 is fixed to the end of the member 12 and engages the sprocket wheel 20 so as to afford convenient assembly and prevent axial movement in one direction of the sprocket wheel relative to the member 12 when the parts are assembled.

A resilient driving connection for driving in either direction of rotation is provided between the sprocket wheel 20 and the driven member 12, which includes a pair of disc members 28 and 30. The disc members are rotatably mounted on the member 12 and bear against an annular shoulder 31 so that axial movement of the discs and the sprocket wheel in this direction is prevented. The disc 28 has an elongated curved slot 32 therethrough; and the disc 30 has a similar slot 34 therethrough. The slots 32 and 34 are described about the centers of the discs, one of the slots extending around one side of its disc and the other slot extending around the opposite side of its disc. The driving connection between the wheel 20 and the respective disc is effected by a drive pin 36 which is fixed to the wheel 20 and which extends through both of the slots 32 and 34. The arrangement of the pin 36 relative to the elongated slots 32 and 34 thus affords a lost motion driving connection between the wheel 20 and the respective disc so that as the wheel 20 is rotated in one direction, it engages one end of one of the slots causing a positive drive on that particular disc; and when rotated in the opposite direction, the pin engages the opposite end of the other slot effecting a positive drive of that particular disc in a manner that will become more apparent from the hereinafter detailed description of other parts of the mechanism.

The disc 28 has diametrically opposed radially extending ears 38 and 40 formed integral therewith; and the disc 30 has diametrically opposed radially extending similar ears 42 and 44 formed integral therewith. The ears 38, 40, 42, and 44 are arranged on their respective discs so that when the discs are positioned relative to each other when the mechanism is unloaded, the ears 38 and 44 are substantially 60 degrees apart and the ears 40 and 42 are substantially 60 degrees apart. Axially extending bosses 46, 48, 50, and 52 are provided on the ears 38, 40, 42, and 52, respectively, and extend axially toward the bosses 17 and 19 in substantially the same cross-sectional plane.

To provide resilient driving connections between the respective discs 28 and 30 and the driven membr 12 through the lever arms 16 and 18, elongated spiral spr'... members are provided. When the mechanism is unloaded, the boss 17 is adapted to lie intermediate the bosses 46 and 50; and the boss 18 is adapted to lie intermediate the bosses 48 and 52. A spiral spring 54 has one end connected to the boss 17 and has its opposite end connected to the boss 46; and a similar spring 56 has one end connected to the boss 18 and its opposite end connected to the boss 48. The springs 54 and 56 thus provide the resilient connection between the driven member 12 and the disc member 28. To provide a resilient connection between the driven member 12 and the disc member 30, the spiral spring 58 has one end connected to the boss 17 and its opposite end connected to the boss 50; and a similar spring 60 has one end connected to the boss 19 and its opposite end connected to the boss 52. In order to fix the spring members on the bosses 17 and 19, washers 62 may be slipped over the end of the bosses and held in place by suitable means, such as cotter pins; and the opposite ends of the springs may be attached to their respective bosses on the disc members by similar means.

In the operation of the structure so far described, upon rotation of the sprocket wheel 20 in a counterclockwise direction, viewing Figs. 2, 4, and 6, the driving pin 36 engages the left hand end of the slot 32 and positively drives the disc 28 in a counterclockwise direction. The springs 54 and 56 are loaded in tension and thus drive the member 12 through the lever arms 16 and 18 in a counterclockwise direction. As the load increases, the relative movement between the disc member 32 and the lever arms 16 and 18 on the driven member 12 correspondingly increases with the result that the relative movement between the sprocket wheel 20 and the member 12 correspondingly increases. During rotation in this direction, the springs 58 and 60 are relaxed and no load is placed thereon as the disc 30 is free to move within its slot 34 relative to the driving pin 36.

With rotation of the sprocket wheel 20 in the opposite direction, that is, clockwise, viewing Figs. 2, 4, and 6, the disc 30 is positively driven and the springs 58 and 60 are elongated as the load increases, with the springs 54 and 56 remaining idle, the reverse action taking place from that described above for a counterclockwise movement of the sprocket wheel 20.

From the above description, it is evident that the relative movement between the sprocket wheel and the driven member increases as the load increases, and according to the present invention, such relative movement is utilized to actuate mechanism, to be described, which in turn cuts out the driving motor when certain predetermined loads are exceeded. This mechanism includes a ring member 70 which is mounted for axial movement relative to the driven member 12 and for rotation therewith. A short tubular member 72, which is preferably aluminum or similar light weight material, is attached to the inner face of the driven member 12 co-axial therewith in embracing relation to a boss 74 on the inner face of the member 12. A suitable number of screw members 76 engage the member 72 through the arm portions 16 and 18 to attach the member 72 to the member 12. It is to be understood that the member 72 could be formed integral with the member 12, in which event it would be preferable to form the unitary structure of a strong, light-weight material.

The ring member 70 has a hub portion 78 which slidably embraces the peripheral surface of the tubular member 72 so that it may axially slide thereover. The ring 70 rotates with the driven member 12, and such rotation is effected through a longitudinally extending guideway 80 formed in the tubular member 72. A pair of roller members 82 are fixed to the hub portion 78 by means of screws 84, or the like, and extend within the guideway 80 engaging the side walls thereof as the ring member 70 is moved axially of the tubular member 72. By the use of the rollers 82, a minimum of wear occurs between the parts 72 and the rollers so that the recording ring 70 is positively and firmly held against rotation relative to the member 72 with a minimum danger of looseness due to wear.

In order to cause the axial movement of the ring upon the application of various loads to the control mechanisms, a cam ring 86 having a cam surface 88 of required configuration is fixedly attached to the inner face of the sprocket wheel 20 co-axial therewith. Suitable means such as screws 89 may be utilized for attaching the cam ring 86 to the wheel 20. While the cam surface 88 may be given various designs within the present invention, Fig. 5 diagrammatically illustrates the developed cam ring 86 according to the structural embodiment illustrated in Figs. 1 to 4, and 6. Inwardly extending rollers 90 are fixed to that cup-shaped portion of the ring 70 which extends toward the cam ring 86; and the rollers 90 are adapted to follow the cam surface 88 to effect the axial movement of the recording ring 70.

In order to urge the ring 70 toward the cam ring 86 so that the rollers at all times engage the cam surface 88, a spiral spring 92 is disposed within the tubular member 72. A transversely extending rod member 94 extends through longitudinally extending, diametrically opposed openings 96 through the walls of the tubular member 72 and is fixed to the recording ring 78. The spring 92 is held within the tubular member 72 and bears against the pin 94 by an end cap 98, suitably removably attached to the exposed face of the tubular member 72 by means of screws 99, or the like. One end of the spring 92 engages over a co-axial hub portion 101 on the cap member 98 and the other end bears against the pin 94 so that the pin 94 and, therefore, the recording ring 70 are urged toward the cam ring 86. While in this embodiment the spring means 92 for urging the recording ring toward the cam ring, is illustrated as being within the tubular member 72, it is evident that such a spring means could be placed on the outside of the tubular member 72 and bear against the end of the hub portion 78 to accomplish the same result. In that event, it would merely be necessary to extend the peripheral edge of the member 98 radially outwardly so as to engage the spring.

The extent of axial movement of the ring 70 relative to the member 72 may be used as an indicator of the torque by providing a scale 75 around the member 72. The position of the rear edge of the hub portion 78 on the scale thus indicates the applied torque.

As described above, as the load increases, relative movement between the driving and driven member occurs. As the load increases from no load to over-load, the ring is caused to move axially away from the sprocket wheel 20. The line 103 in Fig. 1 illustrates the position of the ring at no-load; and when the mechanism is first started, the starting torque moves the ring in the position indicated by the line 104; and at normal working load, the ring settles to a position substantially indicated at line 105. When the ring reaches a predetermined point for a predetermined maximum load, movement beyond this point actuates a switch mechanism generally indicated at 106 which is connected in the circuit for the driving motor and which operates to disconnect the driving motor so as to prevent injury to the mechanism with which the device is operatively associated. The switch 106 includes a lever arm 108 which is pivoted at 110 to a bracket 112. The bracket 112 may be mounted on a suitable base adjacent the recording ring 70 and to the rear thereof. The lever arm is normally urged toward the ring 70 by means of a leaf spring 114.

A supporting head 116 is threadably received within the top of the lever 108 facing the rear face of the ring. The head 116 is adapted to rotatably receive therein a hardened ball member 118 which is spaced from the major portion of the inner walls of the head 116 by means of small bearings 120. The ball 118 is thus free to rotate in all directions within the head 116. In order to adjust the position of the ball member 118 with a relative degree of fineness, the lever arm 108 is provided with a rearwardly directed shelf 122; and a set screw 124 is threadably received within a suitable opening in the base 112 and is adapted to bear against the top of the shelf 122. By threadably adjusting the position of the screw 124, it is evident that the lever 108 may be set about the pivot 110 thus adjusting the position of the ball 118.

A mercury switch 126 of conventional construction is fixedly attached to the pivot arm 108 and has wires 128 and 130 associated therewith in the usual way which lead to the circuit for the electric motor so that when the lever arm 108 is pivoted beyond a certain position, the mercury switch is tilted and acts to cut out the motor by breaking the circuit therethrough. An annular surface 132 is finished smooth on the rear face of the recording ring 70 and is adapted to bear against the ball member 118 when the mechanism is over-loaded. The normal position of the ball member 118 is very slightly beyond the line 104, that when this load is exceeded the surface 132 engages the ball member 118 tilting the lever 108 and tilting the mercury switch 126 to cut out the motor.

One important feature of the present invention is that the construction and arrangement of the parts are such that the over-load control mechanism becomes more sensitive to increases in load as the load approaches its maximum. For a better understanding of this, reference may be had to Fig. 6 in which the reaction in one of the spring members for various positions is diagrammatically illustrated. It will be evident that the behaviour of the other spring members is similar. The numerals A, B, C, and D illustrate the various positions for the boss 48 as the load is increased. In order to illustrate the relative movement, the boss 19 is illustrated as remaining stationary while the boss 48 is moved relative thereto. The spring 56 extends in a straight line between the bosses 48 and 19 for all relative positions of the bosses. The line 140 illustrates the position of the center line of the spring 56 for position A; line 141, for position B; line 142, for position C; and line 143, for position D. The lever arm, against which the spring acts, is represented by a line from the center E perpendicular to the center line of the spring 56 for its various positions. Thus line 150 represents the lever arm against which the spring acts for position A; line 151 represents the lever arm for position B; line 152 represents the lever arm for position C; and line 153 represents the lever arm for position D. Referring to Fig. 6, it is evident that as the load increases, that is as the boss 48 moves toward position D, the lever arm against which the spring acts progressively decreases so that this lever arm is smallest at the point of maximum load. The mechanism is therefore more sensitive as the load increases and is most sensitive when the load approaches its maximum.

While in the above described embodiment the sprocket wheel 20 has been described as the driving member, and the member 12 has been described as the driven member, it is evident that this could be reversed and the sprocket wheel 20 could be the driven member and the member 12 be the driving member.

In Figs. 8 and 9, an embodiment of the present invention is illustrated in which the structure is adapted for use with a flexible coupling. A shaft 170 may be considered as the driving shaft and shaft 172 may be considered as the driven shaft. A plate member 174 is keyed to one end of the shaft 170 for rotation therewith and has a hub portion 176 which embraces the inner end of the shaft 170. The discs 28 and 30 are rotatably mounted on the inner portion of the hub 176 and are fixed in place by means of a collar 180 which may be fixed to the hub 176. The driving pin 36 is fixed to and extends through the member 174 and engages the disc members 28 and 30 through their respective slots 32 and 34 as in the embodiment described above. The cam ring 86 is formed integral with the member 174, or it may be formed separately and suitably attached thereto, and the cam face 88 of the cam ring 86 is adapted to engage the rollers 90 of the recording ring 70 in the same manner as in the embodiment described above.

The driven shaft 172 has the hub 180 of a lever member 182 keyed thereto for rotation with the shaft 172. The lever member 182 corresponds to the member 12 in the embodiment described above, and has the radially extending arms 16 and 18 which have the bosses 17 and 19, respectively, on the outer ends thereof. The springs 54, 56, 58 and 60 are provided in the embodiment illustrated in Fig. 8 in the same relationship as in the embodiment described above, so that the driving connection between the members 174 and 178 in Fig. 8 is substantially the same as the driving connection between the sprocket 20 and the driven member 12 in the embodiment described in connection with Figs. 1 to 7. (Member 182 has diametrically opposed radially extending elongated grooves 190 therein which correspond to the grooves 80 and which are adapted to slidably receive therein the rollers 82.)

In this embodiment two pairs of rollers diametrically opposed are provided and attached to the recording ring 70. L-shaped bracket members 192 are fixed to the inner ends of screws 84 and have fixed thereto an annular member 194 which surrounds the hub 180 and against which the spring 92 bears in order to urge the recording ring 70 against the cam ring 86. In this embodiment the spring 92 embraces the hub portion 180 and is held in place by means of an end cap 196 fixed to the hub portion 80 for rotation therewith.

The longitudinal guideways for the rollers 82 which permit the axial movement of the recording valve 70 are formed by split rings 198 and 199 providing spaces therebetween to form the longitudinally extending groove 201 therebetween. The rings 198 and 199 are fixed to the member 182 for rotation therewith so that the recording valve 70 rotates with the member 182.

The operation of the structure illustrated in Figs. 8 and 9 is substantially the same as that in the embodiment illustrated in Figs. 1 to 7, and it is not believed that it is necessary to discuss in detail the operation of this embodiment. It is sufficient to say that upon application of overload the recording valve 70 moves into engagement with the ball member 118 and actuates the switch 106 to disconnect the driving mechanism.

While both embodiments have been illustrated in association with a mercury switch, it is evident that other forms of cut-outs may be employed, such as a limit switch.

Formal changes may be made in the specific embodiments of the invention described without departing from the spirit and substance of the invention, the scope of which is commensurate with the appended claims.

What is claimed is:

1. The combination of a drive element, a driven element, and torque controlled means providing a driving connection between said elements, said last named means including a member fixedly connected to one of said elements, disc members connected to the other of said elements for rotation therewith, spring means connecting said first named member and said disc members respectively providing a resilient connection therebetween, the construction and arrangement of said spring means relative to said disc members and to said first named members being such that the lever arm against which the spring acts decreases with increase in load.

2. The combination of a drive element, a driven element, and torque controlled means providing a driving connection between said element, said last named means including a member fixedly connected to one of said elements, disc members connected to the other of said elements for rotation therewith, spring means unconfined throughout their length connecting said first named member and said disc members respectively providing a resilient connection therebetween, the construction and arrangement of said spring means relative to said disc members and to said first named members being such that the lever arm against which the spring acts decreases with increase in load.

3. The combination of a drive element, a driven element, and torque controlled means providing a driving connection between said elements, said last named means including a member fixedly connected to one of said elements, disc members connected to the other of said elements for rotation therewith, spiral springs connecting said first named member and said disc members respectively providing a resilient connection therebetween, said spiral springs lying in straight lines at all times, the construction and arrangement of said spiral springs relative to said disc members and to said first named member being such that the lever arm against which the springs act decreases with increase in load.

4. The combination of a driving element, a driven element, and means providing a driving connection between said elements, said last named means including a member fixedly connected to one of said elements, a pair of disc members, means mounting said disc members to the other of said elements for rotation therewith, resilient means connecting said first named member and said disc members respectively, the connection between said disc members and said other of said elements being so constructed that said disc members may rotate relative to each other so as to provide a lost motion connection between said disc members and said other of said elements.

5. The combination of a driving element, a driven element, and torque controlled means providing a driving connection between said elements, said last named means including a member fixedly connected to one of said elements, disc members having elongated openings therethrough, a pin member extending through said elongated openings and fixed to the other of said elements to provide a lost motion connection between said disc members and said other of said elements, spring means connecting said first named member and said disc members respectively providing a resilient connection therebetween, the construction and arrangement of said spring means relative to said disc members and to said first named member being such that the lever arm against which the spring acts decreases with increase in load.

6. The combination of a driving element, a driven element, and torque controlled means providing a driving connection between said elements, said last named means including a member fixedly connected to one of said elements, disc members connected to the other of said elements for rotation therewith, spring means connecting said first named member and said disc members respectively providing a resilient connection therebetween and permitting relative movement therebetween, an annular member connected to one of said elements and extending radially outwardly therebeyond, means connecting said annular member with said one of said elements for axial movement relative thereto, said connecting means including a roller secured to said annular member adjacent the inner edge thereof which engages in an elongated slot in said one of said elements so that said annular member is rotated with said one of said elements and is movable axially relative thereto, a cam ring fixed to the other of said elements, and a roller mounted on said annular member radially outwardly disposed from said first named roller element adapted to be engaged by said cam ring to cause said axial movement.

7. The combination of a driving element, a driven element, and torque controlled means providing a driving connection between said elements, said last named means including a first member fixedly connected to one of said elements, a second member connected to the other of said elements for rotation therewith, resilient means connecting said first and second named members, an annular member connected to one of said elements and extending radially outwardly therebeyond, means connecting said annular member with said one of said elements for axial movement relative thereto, said connecting means including a roller element secured to said annular member and located toward the center thereof which engages in an elongated slot in said one of said elements so that said annular member is rotated with said one of said elements and is movable axially relative thereto, a cam ring fixed to the other of said elements, and a roller mounted on said annular member disposed outwardly from said first named roller adapted to be engaged by said cam ring to cause said axial movement.

ERIC O. MELMER.